United States Patent
Li et al.

(10) Patent No.: US 12,094,484 B2
(45) Date of Patent: Sep. 17, 2024

(54) GENERAL SPEECH ENHANCEMENT METHOD AND APPARATUS USING MULTI-SOURCE AUXILIARY INFORMATION

(71) Applicant: ZHEJIANG LAB, Zhejiang (CN)

(72) Inventors: Jingsong Li, Hangzhou (CN); Zhenchuan Zhang, Hangzhou (CN); Tianshu Zhou, Hangzhou (CN); Yu Tian, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/360,838

(22) Filed: Jul. 28, 2023

(65) Prior Publication Data

US 2024/0079022 A1 Mar. 7, 2024

(30) Foreign Application Priority Data

Jul. 29, 2022 (CN) .......................... 202210902896.7

(51) Int. Cl.
*G10L 21/0232* (2013.01)
*G10L 17/02* (2013.01)
(Continued)

(52) U.S. Cl.
CPC .......... *G10L 21/0232* (2013.01); *G10L 17/02* (2013.01); *G10L 17/04* (2013.01); *G10L 25/30* (2013.01)

(58) Field of Classification Search
CPC .................................................. G10L 21/232
(Continued)

(56) References Cited

U.S. PATENT DOCUMENTS 8,638,502 B2 * 1/2014 Pugh ........................ G02B 3/14
351/159.68
10,614,827 B1 * 4/2020 Korjani ............... G10L 21/0364
(Continued)

FOREIGN PATENT DOCUMENTS

CN 109785852 A 5/2019
CN 111009252 A1 4/2020
(Continued)

OTHER PUBLICATIONS

D. Michelsanti et al., "An Overview of Deep-Learning-Based Audio-Visual Speech Enhancement and Separation," in IEEE/ACM Transactions on Audio, Speech, and Language Processing, vol. 29, pp. 1368-1396, 2021, doi: 10.1109/TASLP.2021.3066303. keywords: {Speech enhancement;Acoustics; Visualization; Task (Year: 2021).*

(Continued)

*Primary Examiner* — Bharatkumar S Shah
(74) *Attorney, Agent, or Firm* — W&G Law Group

(57) ABSTRACT

The present disclosure discloses a general speech enhancement method and apparatus using multi-source auxiliary information. The method includes following steps: S1: building a training data set; S2: using the training data set to learn network parameters of a model, and building a speech enhancement model; S3: building a sound source information database in a pre-collection or on-site collection mode; S4: acquiring an input of the speech enhancement model; and S5: taking a noisy original signal as a main input of the speech enhancement model, taking auxiliary sound signals of a target source group and auxiliary sound signals of an interference source group as side inputs of the speech enhancement model for speech enhancement, and obtaining an enhanced speech signal.

9 Claims, 5 Drawing Sheets

(51) Int. Cl.
*G10L 17/04* (2013.01)
*G10L 25/30* (2013.01)

(58) Field of Classification Search
USPC .......................................................... 704/232
See application file for complete search history.

(56) References Cited

U.S. PATENT DOCUMENTS

| | | | |
|---|---|---|---|
| 2011/0135107 | A1 | 6/2011 | Konchitsky |
| 2018/0366138 | A1 | 12/2018 | Ramprashad |
| 2019/0005976 | A1 | 1/2019 | Peleg et al. |
| 2020/0211580 | A1 | 7/2020 | Lee et al. |
| 2022/0013133 | A1* | 1/2022 | Huang ................ G10L 21/0208 |

FOREIGN PATENT DOCUMENTS

| | | | |
|---|---|---|---|
| CN | 111653288 | A | 9/2020 |
| CN | 112289333 | A | 1/2021 |
| CN | 112786064 | A | 5/2021 |
| CN | 112927707 | A | 6/2021 |
| CN | 113284507 | A | 8/2021 |
| CN | 113345460 | A | 9/2021 |
| CN | 113921022 | A | 1/2022 |
| CN | 114242098 | A | 3/2022 |
| CN | 114255782 | A | 3/2022 |
| CN | 114333895 | A | 4/2022 |
| CN | 114360571 | A | 4/2022 |
| CN | 11695947 | A * | 10/2023 |
| CN | 116959471 | A * | 10/2023 |
| WO | 2021205494 | A1 | 10/2021 |

OTHER PUBLICATIONS

L. Zhang, M. Wang, Q. Zhang, X. Wang and M. Liu, "PhaseDCN: A Phase-Enhanced Dual-Path Dilated Convolutional Network for Single-Channel Speech Enhancement," in IEEE/ACM Transactions on Audio, Speech, and Language Processing, vol. 29, pp. 2561-2574, 2021, doi: 10.1109/TASLP.2021.3092585. keywords: {S (Year: 2021).*
Notice Of Allowance(CN202210902896.7); Date of Mailing: Sep. 27, 2022.
First Office Action(CN202210902896.7); Date of Mailing: Sep. 16, 2022.
Speech-Enhancement-and-Noise-Reduction-Based-on-Self- adaptive-Filter.
Research-and-implementation-of-adaptive-beamforming-speech-enhancement-method ( Mechanical translation ).
A-Method-Based-on-Double-channel-Adaptive-Noise-Cancelling-for-Speech-Enhancement.

* cited by examiner

GENERAL SPEECH ENHANCEMENT METHOD AND APPARATUS USING MULTI-SOURCE AUXILIARY INFORMATION

CROSS-REFERENCE TO RELATED APPLICATIONS

The present application claims priority to Chinese Patent Application No. 202210902896.7, filed on Jul. 29, 2022, the content of which is incorporated herein by reference in its entirety.

TECHNICAL FIELD

The present disclosure relates to the technical field of speech processing, in particular to a general speech enhancement method and an apparatus using multi-source auxiliary information.

BACKGROUND

The goal of speech enhancement is to improve the quality and intelligibility of speech signals that could have been degraded by various factors such as noise, reverberation, and distortion, so as to make speech signals more clear and understandable for human or for automatic speech recognition systems. Speech enhancement is a fundamental method and task in speech signal processing. In many applications, only by separating the speech from background interference and noise as much as possible, subsequent processing procedures can achieve good effects. Early speech enhancement algorithms were dominated by unsupervised learning algorithms, and in recent years, with the advancement of deep learning methods, supervised learning algorithms with noisy features as inputs and clean features as targets have brought a great progress to the field of the speech enhancement algorithms. Currently, mainstream speech enhancement methods based on the deep learning algorithms firstly extract spectrum features from noisy signals, then estimate mask information such as an ideal binary mask or an ideal ratio mask based on the spectrum features, and after masking noisy spectrum features to some extent, reconstruct a clean speech through inverse short-time Fourier transform. The problems with such methods are that the short-time Fourier transform required for extracting the spectrum features requires signals with a fixed window length, which affects the real-time performance of the algorithms to a certain extent; and moreover, the spectrum features designed manually may not be perfectly suited for speech enhancement tasks. In addition, in practical applications, it is usually possible to obtain richer prior information on different sound sources in practical scenarios, such as a historical audio of device users, a historical audio of speakers coexisting with environmental interference for a long time, and historical data of environmental noise. The previous speech enhancement algorithms seldom utilize such information. Although a relatively small amount of works begin to explore and use historical information of a main target speaker for personalized speech enhancement, use of a plurality of kinds of available sound source auxiliary information is still insufficient.

Therefore, a general speech enhancement method and an apparatus using multi-source auxiliary information are proposed to solve the above technical problems.

SUMMARY

In order to solve the above technical problems, the present disclosure provides a general speech enhancement method and apparatus using multi-source auxiliary information.

A technical solution adopted by the present disclosure is as follows:

a general speech enhancement method using multi-source auxiliary information includes following steps:

step S1: building a training data set;

step S2: building a speech enhancement model composed of three subnetworks: an encoder module, an attention module and a decoder module, and using the training data set to learn network parameters of the speech enhancement model;

step S3: building a sound source information database in a pre-collection or on-site collection mode;

step S4: acquiring an input of the speech enhancement model, the input includes a noisy original signal to be processed and auxiliary sound signals of a target source group and auxiliary sound signals of an interference source group, and the auxiliary sound signals of the above groups are obtained by using the sound source information database; and step S5: taking the noisy original signal as a main input of the speech enhancement model, taking the auxiliary sound signals of the target source group and the auxiliary sound signals of the interference source group as side inputs of the speech enhancement model, and obtaining an enhanced speech signal.

Furthermore, step S1 specifically includes following sub-steps:

step S11: collecting a fundamental data set, the fundamental data set consists of three parts: a clean human speech data set, a noise data set and a room impulse response data set;

step S12: randomly selecting a certain speaker as a target speaker in the clean human speech data set, and randomly extracting a target utterance and a target auxiliary information utterance from a speech corpus of the target speaker; randomly selecting another different speaker from the clean human speech data set as an interfering speaker, and randomly extracting an interference utterance and an interference auxiliary information utterance from a speech corpus of the interference speaker;

step S13: randomly extracting a noise audio from the noise data set;

step S14: randomly selecting an impulse response from the room impulse response data set, and applying this impulse response to the target utterance to get a reverberant target utterance;

step S15: mixing the reverberant target utterance, the interference utterance and the noise audio with a set of randomly-chosen signal-to-noise ratios to obtain a simulated noisy audio; and step S16: saving the target utterance, the simulated noisy audio, the target auxiliary information utterance and the interference auxiliary information utterance in the form of quadruple to obtain the training data set.

Furthermore, step S2 specifically includes following sub-steps:

step S21: building the speech enhancement model according to three subnetworks: the encoder module, the attention module and the decoder module, and extracting data in the form of quadruple from the training data set, the data in the form of quadruple includes the target utterance, the simulated noisy audio, the target auxiliary information utterance and the interference auxiliary information utterance;

step S22: inputting the simulated noisy audio, with the target auxiliary information utterance and the interference auxiliary information utterance into the speech enhancement model, to obtain the enhanced speech signal, and calculating an scale-invariant signal-to-noise ratio (SISNR) loss function, a spectrum loss function and an amplitude loss function by using the target utterance and the enhanced speech signal;

step S23: building a total loss function according to the SISNR loss function, the spectrum loss function and the amplitude loss function;

step S24: updating parameters of the speech enhancement model by using a model updating algorithm of gradient descent deep learning according to the total loss function; and step S25: repeating step S21 to step S24 until the number of iterations for updating reaches a preset number of learning steps, or when certain epochs of training are completed on all data of the training data set, or when a rate of descent using the total loss function is lower than a preset threshold, or when a relative decline of an in-round average loss function between adjacent training rounds in the training data set is less than 10%, stopping updating and iterating of the speech enhancement model, and obtaining the network parameters of the speech enhancement model.

Furthermore, the pre-collection in step S3 is collection of the speaker's registration data in a voiceprint system and/or speech data in historical conversations; and the on-site collection requires a user to produce sounds and speak, and requires the use of a microphone to record a sound production process, thereby obtaining a recording result, and the recording result is auxiliary information of the corresponding user.

Furthermore, step S4 specifically includes following sub-steps:

step S41: acquiring a user's audio signal through collection of a pickup device and network transmission and/or directly using an existing audio file on a memory to obtain the noisy original signal to be processed; and step S42: manually selecting a target group of sound source and an interference group of sound source by a user according to actual demands, and extracting the corresponding auxiliary sound signals of the target source group and auxiliary sound signals of the interference source group from the sound source information database.

Furthermore, step S5 specifically includes following sub-steps:

step S51: obtaining an original signal representation from the noisy original signal by the corresponding encoder module; and obtaining an auxiliary sound signal representation of the target source group and an auxiliary sound signal representation of the interference source group from the auxiliary sound signals of the target source group and the auxiliary sound signals of the interference source group respectively by the corresponding encoder module;

step S52: sequentially reading, by the attention model, a first signal representation pair and a second signal representation pair from the original signal representation, the auxiliary sound signal representation of the target source group and the auxiliary sound signal representation of the interference source group, and obtaining an auxiliary sound signal representation mask of the target source group and an auxiliary sound signal representation mask of the interference source group. The first signal representation pair includes the original signal representation and the auxiliary sound signal representation of the target source group, and the second signal representation pair includes the original signal representation and the auxiliary sound signal representation of the interference source group;

step S53: fusing the auxiliary sound signal representation mask of the target source group and the auxiliary sound signal representation mask of the interference source group through attention fusion, and obtaining a fusion mask;

step S54: obtaining an enhanced representation from the original signal representation by applying the fusion mask; and step S55: converting the enhanced representation into the enhanced speech signal by using the decoder module.

Specifically, step S52 specifically includes following sub-steps:

step S521: the attention model being formed by stacking a plurality of same Conformer modules, and each Conformer module being formed by successively connecting a first fully connected layer FFN, a convolution layer Conv, a first multi-head cross attention layer MHCA, a second multi-head cross attention layer MHCA, a feature-wise linear modulation layer FiLM, a second fully connected layer FFN and a layer normalization layer LayerNorm;

step S522: obtaining an advanced representation of the original signal, an advanced representation of the auxiliary sound signals of the target source group and an advanced representation of the auxiliary sound signals of the interference source group by sequentially passing the original signal representation, the auxiliary sound signal representation of the target source group and the auxiliary sound signal representation of the interference source group through the first fully connected layer FFN and the convolution layer Conv in the Conformer module;

step S523: loading the advanced representation of the original signal, as a value, the advanced representation of the auxiliary sound signals of the target source group, as a query, and the advanced representation of the auxiliary sound signals of the interference source group, as a key, into the first multi-head cross attention layer MHCA, so as to respectively obtain an original signal modulation vector corresponding to the auxiliary sound signals of the target source group and an original signal modulation vector corresponding to the auxiliary sound signals of the interference source group;

step S524: modulating, by the feature-wise linear modulation layer FiLM, the advanced representation of the original signal on the basis of the original signal modulation vector corresponding to the auxiliary sound signals of the target source group or the original signal modulation vector corresponding to the auxiliary sound signals of the interference source group, so as to respectively obtain a more-advanced representation of the original signal corresponding to the auxiliary sound signals of the target source group after modulation and a more-advanced representation of the original signal corresponding to the auxiliary sound signals of the interference source group after modulation;

step S525: loading the more-advanced representation of the original signal corresponding to the auxiliary sound signals of the target source group after modulation, as a value, the more-advanced representation of the original signal corresponding to the auxiliary sound signals of the interference source group after modulation, as a key, and the advanced representation of the original signal, as a query, into the second multi-head cross attention layer MHCA, so as to obtain an advanced representation of the original signal, corresponding to the auxiliary sound signals of the target source group, after cross conditioning and an advanced representation of the original signal, corresponding to the auxiliary sound signals of the interference source group, after cross conditioning;

step S526: obtaining an auxiliary sound signal preliminary representation mask of the target source group and an auxiliary sound signal preliminary representation mask of the interference source group by sequentially passing the advanced representation of the original signal, corresponding to the auxiliary sound signals of the target source group, after cross conditioning and the advanced representation of the original signal, corresponding to the auxiliary sound signals of the interference source group, after cross conditioning through the second fully connected layer FFN and the layer normalization layer LayerNorm; and step S527: the input of the next Conformer module being the auxiliary sound signal preliminary representation mask of the target source group, the auxiliary sound signal representation of the target source group, the auxiliary sound signal preliminary representation mask of the interference source group, and the auxiliary sound signal representation of the interference source group obtained in step S526, repeating step S522 to step S526 until all Conformer modules are traversed, so as to obtain auxiliary sound source signal preliminary representation masks of target groups and auxiliary sound signal preliminary representation masks of interference groups corresponding to all the Conformer modules.

Furthermore, step S53 specifically includes following sub-steps:

step S531: performing in-group representation mask fusion on the auxiliary sound signal representation mask of the target source group and the auxiliary sound signal representation mask of the interference source group in an accumulation mode, to respectively obtain an auxiliary sound signal in-group representation mask of the target source group and an auxiliary sound signal in-group representation mask of the interference source group; and step S532: performing intergroup fusion on the auxiliary sound signal in-group representation mask of the target source group and the auxiliary sound signal in-group representation mask of the interference source group in a subtracting mode, to obtain the fusion mask.

The present disclosure further provides a general speech enhancement apparatus using multi-source auxiliary information. The apparatus includes a memory and one or more processors, the memory stores an executable code, and when the one or more processors execute the executable code, the apparatus is configured to achieve the general speech enhancement method using the multi-source auxiliary information according to any one of the above embodiments.

The present disclosure further provides a non-transitory computer-readable storage medium. A program is stored on the non-transitory computer-readable medium, and the program, when executed by a processor, implements the general speech enhancement method using the multi-source auxiliary information according to any one of the above embodiments is achieved.

The present disclosure has beneficial effects:

1. The present disclosure provides the flexible and customizable speech enhancement using the multi-sound-source auxiliary information for orientating, including: extracting the auxiliary sound source signal representation for the sound source auxiliary information; extracting the original signal representation from the original audio information to be enhanced; and loading the original signal representation and the auxiliary sound source signal representation into the speech enhancement model for speech enhancement.

2. The present disclosure provides the method for performing attention modeling and multi-source attention integration on the multi-sound-source auxiliary information, including: collecting the sound source information data; determining sound source compositions of a target group and an interference group, and performing extraction correspondingly from the sound source information database; extracting audio embedded information for each piece of sound source auxiliary information; based on the auxiliary sound source signal representation and the original signal representation, a representation mask corresponding to an original signal is calculated; and according to grouping information, unified fusion is performed on all the sound source representation masks, and the final fusion mask is obtained.

3. The present disclosure provides the general speech enhancement model using the multi-source auxiliary information, which is an end-to-end neural network directly using the audio original waveform signal, and composed of an encoder module of a U-Net structure, a decoder module of a U-Net structure and a Conformer module.

4. The present disclosure can utilize auxiliary information of a plurality of target sound sources and a plurality of interference sound sources, especially the auxiliary information of the interference sound sources. Compared with an existing speech enhancement algorithm in the same field, a speech signal enhanced through the present disclosure has higher speech quality, speech clarity, speech intelligibility and speech naturalness.

DESCRIPTION OF EMBODIMENTS

The following description of at least one exemplary embodiment is in fact illustrative only and never acts as any limitation on the present disclosure and its application or use. Based on the embodiments of the present disclosure, all other embodiments obtained by those ordinarily skilled in the art without creative labor fall within the scope of protection of the present disclosure.

Figure 1:
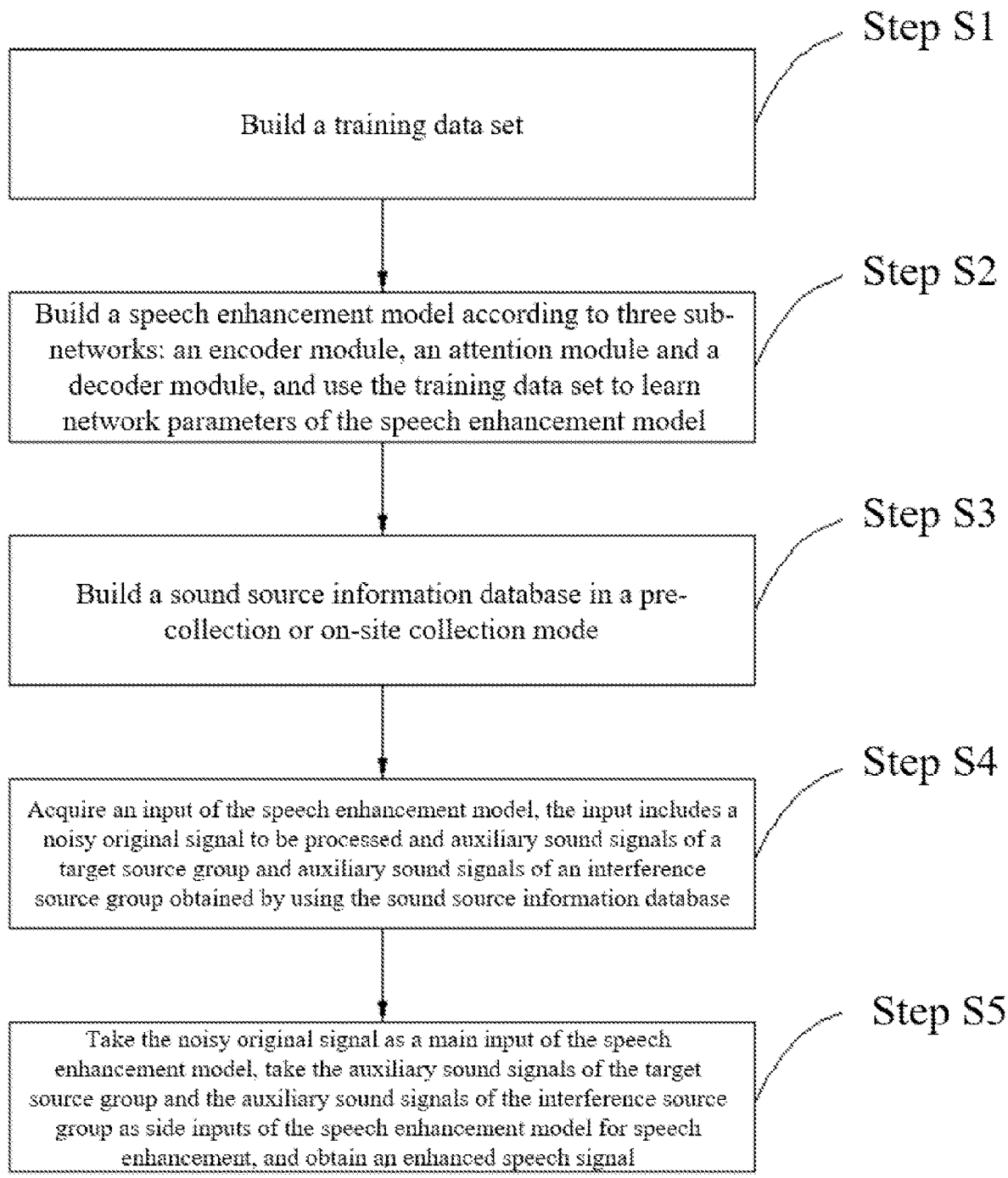
FIG. 1 is a flow diagram of a general speech enhancement method using multi-source auxiliary information of the present disclosure.

Referring to FIG. 1, a general speech enhancement method using multi-source auxiliary information includes following steps:

step S1: a training data set is built;

step S11: a fundamental data set is collected, and the fundamental data set consists of three parts: a clean human speech data set, a noise data set and a room impulse response data set;

step S12: a certain speaker is randomly selected from the clean human speech data set as a target speaker, and a target utterance and a target auxiliary information utterance are randomly extracted from a target speaker speech corpus set; another different speaker is randomly selected from the clean human speech data set as an interference speaker, and an interference utterance and an interference auxiliary information utterance are randomly extracted from an interference speaker speech corpus set;

step S13: a noise audio is randomly extracted from the noise data set;

step S14: an impulse response is randomly selected from the room impulse response data set;

step S15: the target utterance, the interference utterance, the noise audio and the impulse response are calculated through randomly-set signal-to-noise ratios to obtain a simulated noisy audio; and step S16: the target utterance, the simulated noisy audio, the target auxiliary information utterance and the interference auxiliary information utterance are saved in the form of quadruple to obtain the training data set.

Step S2: A speech enhancement model is built according to three subnetworks: an encoder module, an attention module and a decoder module, and the training data set is used to learn network parameters of the speech enhancement model;

step S21: the speech enhancement model is built according to the three sub-networks: the encoder module, the attention module and the decoder module, and data in the form of quadruple are extracted from the training data set, and include the target utterance, the simulated noisy audio, the target auxiliary information utterance and the interference auxiliary information utterance;

step S22: the simulated noisy audio, with the target auxiliary information utterance and the interference auxiliary information utterance, are input into the speech enhancement model, the enhanced speech signal is obtained, and an scale-invariant signal-to-noise ratio (SISNR) loss function, a spectrum loss function and an amplitude loss function are calculated by using the target utterance and the enhanced speech signal;

step S23: a total loss function is built according to the SISNR loss function, the spectrum loss function and the amplitude loss function;

step S24: parameters of the speech enhancement model are updated by using a model updating algorithm of gradient descent deep learning according to the total loss function; and step S25: step S21 to step S24 are repeated until the number of iterations for updating reaches a preset number of learning steps, or when 50 rounds of training are completed on all data in the training data set, or when a rate of descent using the total loss function is lower than a preset threshold, or when a relative decline of an in-round average loss function between adjacent training rounds in the training data set is less than 10%, updating and iterating of the speech enhancement model are stopped, and the network parameters of the speech enhancement model are obtained.

Step S3: A sound source information database is built in a pre-collection or on-site collection mode;

the pre-collection is collection of the speaker's registration data in a voiceprint system and/or speech data in historical conversations; and the on-site collection requires a user to produce sounds and speak, and requires the use of a microphone and recording device to record a sound production process, thus a recording result is obtained, and the recording result is auxiliary information of the corresponding user.

Step S4: an input of the speech enhancement model is acquired, including a noisy original signal to be processed, and auxiliary sound signals of a target source group and auxiliary sound signals of an interference source group which are obtained by using the sound source information database;

step S41: a user's audio signal is acquired through collection of a microphone and network transmission and/or an existing audio file on a memory is directly used to obtain the noisy original signal to be processed; and step S42: a user manually selects a target group of sound source and an interference group of sound source according to actual demands, and the corresponding auxiliary sound signals of the target source group and auxiliary sound signals of the interference source group are extracted from the sound source information database.

Step S5: The noisy original signal is taken as a main input of the speech enhancement model, the auxiliary sound signals of the target source group and the auxiliary sound signals of the interference source group are taken as side inputs of the speech enhancement model for speech enhancement, and an enhanced speech signal is obtained;

step S51: an original signal representation is obtained from the noisy original signal by the corresponding encoder module; an auxiliary sound signal representation of the target source group and an auxiliary sound signal representation of the interference source group are obtained from the auxiliary sound signals of the target source group and the auxiliary sound signals of the interference source group respectively by the corresponding encoder module;

step S52: a first signal representation pair and a second signal representation pair are sequentially read from the original signal representation, the auxiliary sound signal representation of the target source group and the auxiliary sound signal representation of the interference source group by the attention model, and an auxiliary sound signal representation mask of the target source group and an auxiliary sound signal representation mask of the interference source group are obtained. The first signal representation pair includes the original signal representation and the auxiliary sound signal representation of the target source group, and the second signal representation pair includes the original signal representation and the auxiliary sound signal representation of the interference source group;

step S521: the attention model is formed by stacking a plurality of Conformer modules, and each Conformer module is formed by successively connecting a first fully connected layer FFN, a convolution layer Conv, a first multi-head cross attention layer MHCA, a second multi-head cross attention layer MHCA, a feature-wise linear modulation layer FiLM, a second fully connected layer FFN and a layer normalization layer LayerNorm;

step S522: an advanced representation of the original signal, an advanced representation of the auxiliary sound signals of the target source group and an advanced representation of the auxiliary sound signals of the interference source group are obtained by sequentially passing the original signal representation, the auxiliary sound signal representation of the target source group and the auxiliary sound signal representation of the interference source group through the first fully connected layer FFN and the convolution layer Conv in the Conformer module;

step S523: the original signal advanced representation, as a value, the advanced representation of the auxiliary sound signals of the target source group, as a query, and the advanced representation of the auxiliary sound signals of the interference source group, as a key are loaded into the first multi-head cross attention layer MHCA, so as to respectively obtain an original signal modulation vector corresponding to the auxiliary sound signals of the target source group and an original signal modulation vector corresponding to the auxiliary sound signals of the interference source group;

step S524: the feature-wise linear modulation layer FiLM modulates the advanced representation of the original signal on the basis of the original signal modulation vector corresponding to the auxiliary sound signals of the target source group or the original signal modulation vector corresponding to the auxiliary sound signals of the interference source group, to respectively obtain a more-advanced representation of the original signal corresponding to the auxiliary sound signals of the target source group after modulation and a more-advanced representation of the original signal corresponding to the auxiliary sound signals of the interference source group after modulation;

step S525: the more-advanced representation of the original signal corresponding to the auxiliary sound signals of the target source group after modulation, as a value, the more-advanced representation of the original signal corresponding to the auxiliary sound signals of the interference source group after modulation, as a key, and the advanced representation of the original signal, as a query, are loaded into the second multi-head cross attention layer MHCA to obtain an advanced representation of the original signal, corresponding to the auxiliary sound signals of the target source group, after cross conditioning and an advanced representation of the original signal, corresponding to the auxiliary sound signals of the interference source group, after cross conditioning;

step S526: an auxiliary sound signal preliminary representation mask of the target source group and an auxiliary sound signal preliminary representation mask of the interference source group are obtained by sequentially passing the advanced representation of the original signal, corresponding to the auxiliary sound signals of the target source group, after cross conditioning and the advanced representation of the original signal, corresponding to the auxiliary sound signals of the interference source group, after cross conditioning through the second fully connected layer FFN and the layer normalization layer LayerNorm; and step S527: the input of the next Conformer module is the auxiliary sound signal preliminary representation mask of the target source group, the auxiliary sound signal representation of the target source group, the auxiliary sound signal preliminary representation mask of the interference source group, and the auxiliary sound signal representation of the interference source group obtained in step S526, and step S522 to step S526 are repeated until all Conformer modules are traversed, to obtain auxiliary sound source signal preliminary representation masks of target groups and auxiliary sound signal preliminary representation masks of interference groups corresponding to all the Conformer modules.

Step S53: The auxiliary sound signal representation mask of the target source group and the auxiliary sound signal representation mask of the interference source group are fused through attention fusion, and a fusion mask is obtained;

step S531: in-group representation mask fusion is performed on the auxiliary sound signal representation mask of the target source group and the auxiliary sound signal representation mask of the interference source group in an accumulation mode, to respectively obtain an auxiliary sound signal in-group representation mask of the target source group and an auxiliary sound signal in-group representation mask of the interference source group; and step S532: intergroup fusion is performed on the auxiliary sound signal in-group representation mask of the target source group and the auxiliary sound signal in-group representation mask of the interference source group in a subtracting mode, to obtain the fusion mask.

Step S54: The original signal representation uses the fusion mask to obtain an enhanced representation; and step S55: the enhanced representation is converted into the enhanced speech signal by using the decoder module.

Embodiment

Figure 2:
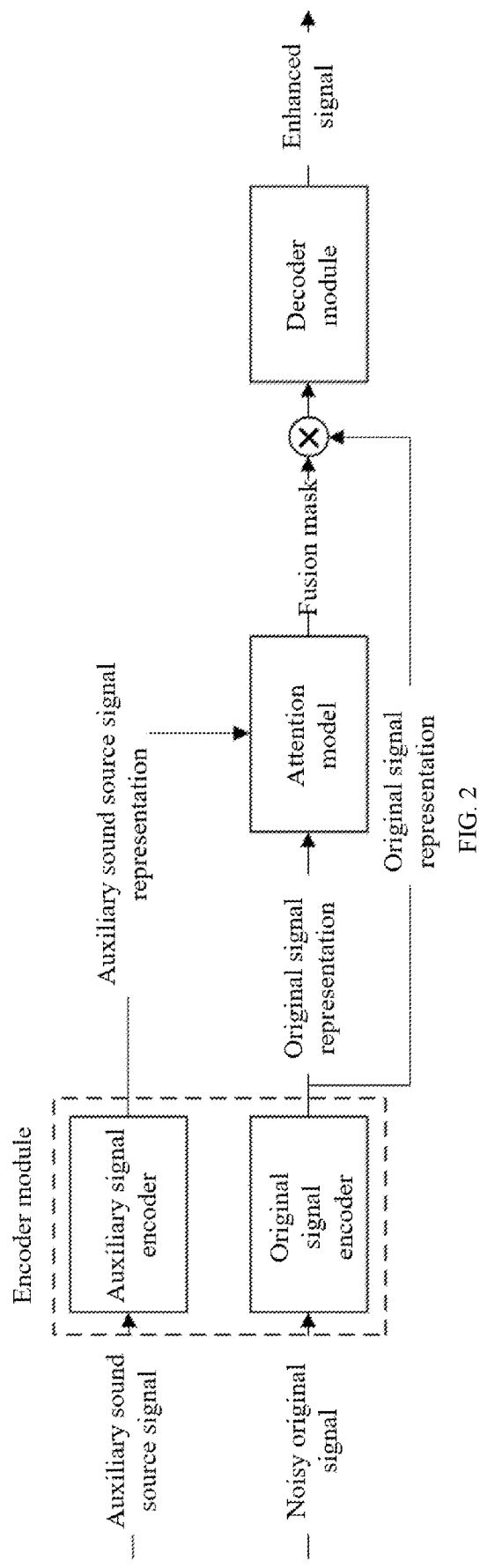
FIG. 2 is a schematic diagram of a speech enhancement model of an embodiment of the present disclosure.

Referring to FIG. 2, a general speech enhancement method using multi-source auxiliary information include following steps:

step S1: a training data set is built;

step S11: a fundamental data set is collected, and the fundamental data set consists of three parts: a clean human speech data set $\mathcal{V}$, a noise data set $\mathcal{N}$ and a room impulse response data set $\mathcal{R}$;

the clean human speech data set $\mathcal{V}=\{S_i, i=1 \ldots N_{sp}\}$, $N_{sp}$ is the number of speakers included in the clean human speech data set, and $S_i$ is a speech corpus of an $i^{th}$ speaker;

collection requirements for the clean human speech data set $\mathcal{V}$ are:

the clean human speech data set should include as many difference speakers as possible;

the speech corpus $S_i$ for $i^{th}$ speaker is a collection of utterances spoken solely by $i^{th}$ speaker;

an utterance in $S_i$ should be as clean and high-quality as possible: in addition to a target speaker, which is $i^{th}$ speaker, the utterance does not include other speakers, music or any other interference, and a background noise should be lower than a certain threshold;

a cumulative duration of all utterances of each speaker should not be less than 10 minutes; and the corpus data of each speaker should cover as many recording conditions as possible, such as different microphones and different recording positions.

If corresponding information does not exist, false input of all 0 is used.

Elements in the noise data set $\mathcal{N}$ are noise audio data, and should cover more kinds of noise as much as possible.

Elements in the room impulse response data set $\mathcal{R}$ are house impulse responses collected in different acoustic environments and may also use house impulse responses generated through a simulation method.

If necessary, steps such as mute elimination, volume normalization and sampling rate unification are performed on the data. In this embodiment, an audio format with a single channel, 16 kHz sampling and 16-bit quantization accuracy is adopted uniformly, and other formats may be selected as well, as long as it needs to pay attention to unifying the formats.

Step S12: A certain speaker a is randomly selected from the clean human speech data set $\mathcal{V}$ as a target speaker, and a target utterance $Ts_i$ and a target auxiliary information utterance $Tr_i$ are randomly extracted from a target speaker corpus set $S_a$; another different speaker is randomly selected from the clean human speech data set $\mathcal{V}$ as an interference speaker b, and an interference utterance $Is_i$ and an interference auxiliary information utterance $Ir_i$ are randomly extracted from an interference speaker corpus set $S_b$;

step S13: a noise audio $N_i$ is randomly extracted from the noise data set $\mathcal{N}$;

step S14: an impulse response $RiR_i$ is randomly selected from the room impulse response data set $\mathcal{R}$;

step S15: the target corpus $Ts_i$, the interference corpus $Is_i$, the noise audio $N_i$ and the impulse response $RiR_i$ are calculated through randomly-set signal-to-noise ratios $SNR_1$ and $SNR_2$ to obtain a simulated noisy audio $Y_i$:

$$Y_i = Ts_i * RiR_i + SNR_1 \cdot Is_i + SNR_2 \cdot N_i$$

step S16: the target corpus, the simulated noisy audio, the target auxiliary information corpus and the interference auxiliary information corpus $(Ts_i, Y_i, Tr_i, Ir_i)$ are saved in the form of quadruple form to obtain the training data set.

In subsequent training steps, the simulated noisy audio $Y_i$ is taken as a main input of the speech enhancement model, and corresponds to the noisy original signal to be enhanced; the target auxiliary information corpus $Tr_i$ and the interference auxiliary information corpus $Ir_i$ are taken as side inputs of the speech enhancement model and respectively correspond to a target auxiliary sound source signal and an interference auxiliary sound source signal; and the target corpus $Ts_i$ is taken as a target output of the speech enhancement model, and corresponds to an enhanced speech signal.

Note: in step S12, the target group and the interference group only including one speaker is taken as an example for illustration, and each group may also include a plurality of speakers.

Step S2: The speech enhancement model is built according to three sub-networks: an encoder module, an attention module and a decoder module, and the training data set is used to learn network parameters of the speech enhancement model;

step S21: the speech enhancement model is built according to the three sub-networks: the encoder module, the attention module and the decoder module, and data in the form of quadruple are extracted from the training data set, and the data in the form of quadruple includes the target corpus, the simulated noisy audio, the target auxiliary information corpus and the interference auxiliary information corpus $(Ts_i, Y_i, Tr_i, Ir_i)$;

for the convenience of expression, the target corpus $Ts_i$ refers to y below;

step S22: the simulated noisy audio $Y_i$, with the target auxiliary information corpus $Tr_i$ and the interference auxiliary information corpus $Ir_i$, are input into the speech enhancement model, the enhanced speech signal $\hat{y}$ is obtained, and an scale-invariant signal-to-noise ratio (SISNR) loss, a spectrum loss function and an amplitude loss function are calculated by using the target corpus y and the enhanced speech signal $\hat{y}$;

$$L_{SISNR}(y, \hat{y}) = -10 \log_{10} \frac{\|\bar{y}\|^2}{\|\hat{y} - \bar{y}\|^2}$$

$$L_{sc}(y, \hat{y}) = \frac{\| |STFT(y)| - |STFT(\hat{y})| \|_F}{\| |STFT(y)| \|_F}$$

$$L_{mag}(y, \hat{y}) = \frac{1}{T} \| \log |STFT(y)| - \log |STFT(\hat{y})| \|_1$$

where, $L_{SISNR}$ is the SISNR loss function, $L_{sc}$ is the spectrum loss function, $L_{mag}$ is the amplitude loss function, y and $\hat{y}$ are the target corpus and the enhanced speech signal respectively, $$\bar{y} = \frac{\langle \hat{y}, y \rangle}{\|y\|^2} \cdot y$$

is the target signal scaled by its inner product with the estimated signal and divided by its own squared L2 norm, $\|\cdot\|^2$, $\|\cdot\|_F$ and $\|\cdot\|_1$ are a squared L2 norm, a Frobenius norm and an L1 norm respectively, and STFT represents a spectrum obtained after short-time Fourier transform is performed on the corresponding signal.

Step S23: a total loss function L is built according to the SISNR loss function, the spectrum loss function and the amplitude loss function, where $\alpha$, $\beta$ are hyperparameters used to balance these loss functions with a value range between 0 and 1:

$$L(y, \hat{y}) = \alpha L_{SISNR}(y, \hat{y}) + \beta L_{sc}(y, \hat{y}) + (1 - \alpha - \beta) L_{mag}(y, \hat{y})$$

step S24: parameters of the speech enhancement model are updated by using a model updating algorithm of gradient descent deep learning according to the total loss function; and step S25: step S21 to step S24 are repeated until the number of iterations for updating reaches a preset number of learning steps, or when 50 rounds of training are completed on all data in the training data set, or when a rate of descent using the total loss function is lower than a preset threshold, or when a relative decline of an in-round average loss function between adjacent training rounds in the training data set is less than 10%, updating and iterating the speech enhancement model are stopped, and the network parameters of the speech enhancement model are obtained.

Step S3: a sound source information database is built in a pre-collection or on-site collection mode;

the sound source information database is built in the pre-collection or on-site collection mode, and the sound source information database includes speech sound source information and non-speech sound source information;

the pre-collection is collection of the speaker's registration data in a voiceprint system and/or speech data in historical conversations; and the on-site collection requires a user to produce sounds and speak, and requires the use of a microphone to record a sound production process, a recording result is obtained, and the recording result is auxiliary information of the corresponding user.

In the general speech application environment, roles usually involved are relatively fixed, and the surrounding environment where a conversation takes place is also relatively fixed. Therefore, after long-term use, various factors involved in a speech conversation will have relatively rich historical information available, such as voiceprint registration corpuses of different speakers and historical conversations. General speech enhancement algorithms are usually not customized for a target object and actual interference sources, but perform general speech enhancement of a general nature in a mode of being unknown to the environment. The main starting point of the embodiment of the present disclosure is how to make use of existing rich historical information of each sound source to perform directional speech enhancement on an audio component.

The sound source information database needs to support management functions of at least three tables: a sound source data table, a speaker information table, and non-speech sound source information table. See Table 1 for the sound source data table, Table 2 for the speaker information table, and Table 3 for the non-speech sound source information table.

TABLE 1

Sound source data table

| Field name | Field meaning |
| --- | --- |
| Aux_id | Main key of sound source data table. |
| Type | Two kinds: speech, speech sound source information; non-speech, and non-speech sound source information, such as noise. |
| Source_id | "Identity" information of sound source to which the present article belongs, such as speaker corresponding to speech sound source and noise source corresponding to noise sound source. Main key corresponding to speaker information table or non-speech sound source information table. |
| Data | Sound source information signal |

TABLE 2

Speaker information table

| Field name | Field meaning |
| --- | --- |
| Speaker_id | Main key of speaker information table. |
| Speaker_info | Basic information of speaker, such as name and gender. Perform field expansion according to actual needs. |

TABLE 3

Non-speech sound source information table

| Field name | Field meaning |
| --- | --- |
| Sound_id | Main key of non-speech sound source information table. |
| Sound_info | Basic information of sound source, such as object generating sound source and bandwidth. Perform field expansion according to actual needs. |

A Data field in the sound source data table corresponds to the sound source auxiliary signal. In the embodiment, the Data field directly stores the audio signal of the sound source (i.e. waveform file), such as speaker_000_000.wav of the speaker. Those skilled in the art can also use other types of sound source auxiliary signals, for example, acoustic features corresponding to speaker_000_000.wav are directly recorded or a neural network encoder is used to extract the audio representation.

The pre-collection is a main acquiring mode, which mainly collects the registered data in the voiceprint system of the speaker and/or speech data in historical sessions, etc.; and the on-site collection requires the user to produce the sounds and speak and record the sound production process with the microphone, and the recording result is the auxiliary information of the corresponding user.

Step S4: an input of the speech enhancement model is acquired, including a noisy original signal to be processed, and auxiliary sound signals of a target source group and auxiliary sound signals of an interference source group which are obtained by using the sound source information database;

step S41: a noisy original signal to be processed is acquired through recording of a microphone, or network transmission or an existing audio file on a memory;

the noisy original signal is a vector, represented by x;

step S42: a user manually selects a target group of sound source and an interference group of sound source according to actual demands, and the corresponding auxiliary sound signals of the target source group and auxiliary sound signals of the interference source group are extracted from the sound source information database;

the auxiliary sound signals of the target source group are represented by $\{t_i, i=1, \ldots, N\}$, which represent a total of N target auxiliary sound sources, and the target auxiliary sound sources are respectively represented by $t_i$; and the auxiliary sound signals of the interference source group are represented by $\{i_j, j=1, \ldots, M\}$, which represent a total of M interference auxiliary sound sources, and the interference auxiliary sound sources are respectively represented by $i_j$.

In the embodiment, on the premise that a fixed network structure and optimized performance meet use needs of most scenarios, N and M use fixed parameters, such as N=4 and M=4. When the number of actually-available sound sources is less than a fixed value, the corresponding sound source signals use padding data whose values are all 0, so that subsequent attention calculation results are also all 0 masking, which does not affect the accuracy of fusion attention. In this way, the method in the embodiment can achieve unification of various speech enhancement modes: traditional speech enhancement with unknown target and interference, personalized speech enhancement for a specific speaker, speech enhancement with directed suppression for specific interference, and a combination of the above modes.

Figure 3:
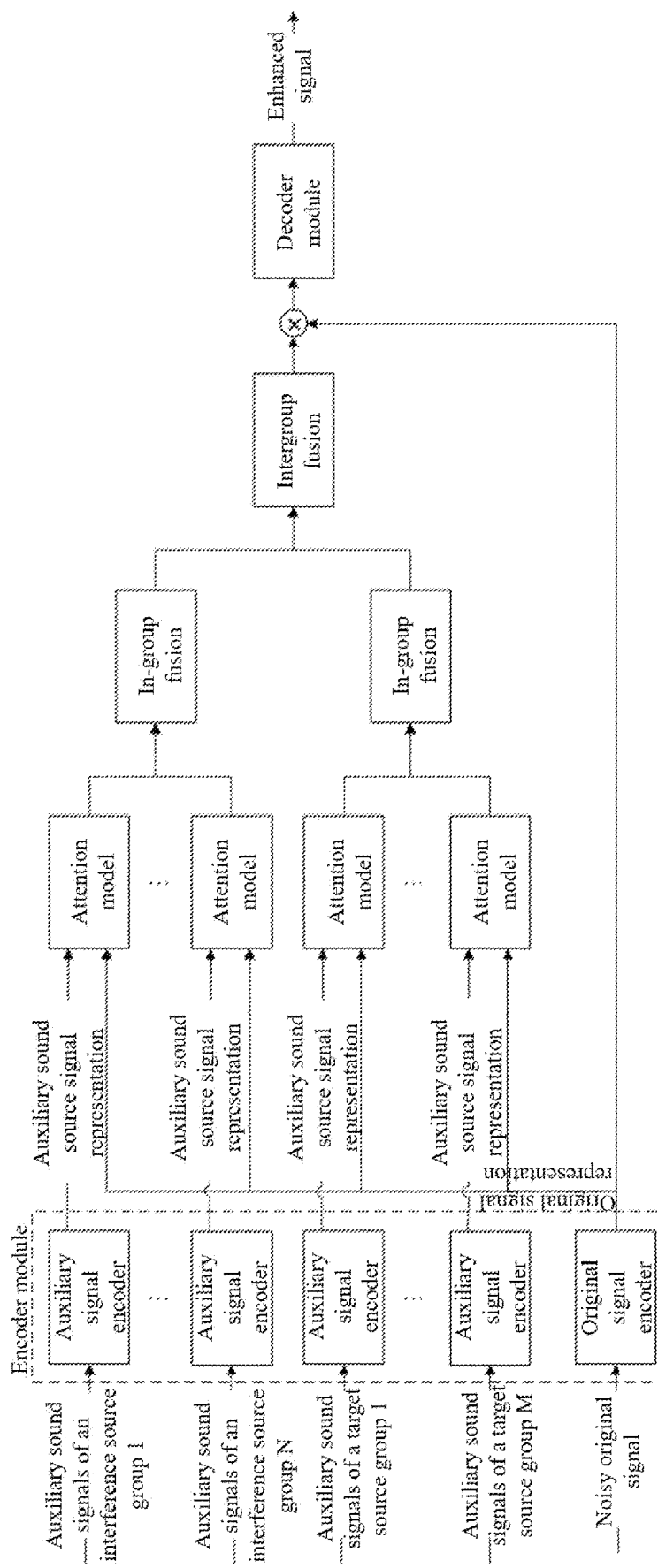
FIG. 3 is a schematic model diagram of speech enhancement of auxiliary sound signals of a target source group and auxiliary sound signals of an interference source group of an embodiment of the present disclosure.

Referring to FIG. 3, step S5: the noisy original signal x is taken as a main input of the speech enhancement model, the auxiliary sound signals of the target source group $\{t_i, i=1, \ldots, N\}$ and the auxiliary sound signals of the interference source group $\{i_j, j=1, \ldots, M\}$ are taken as side inputs of the speech enhancement model for speech enhancement, and an enhanced speech signal $\hat{x}$ is obtained;

S51: an original signal representation $\chi$ is obtained from the noisy original signal x by the corresponding encoder module; an auxiliary sound signal representation of the target source group $\{\mathcal{T}_i, i=1, \ldots, N$ and an auxiliary sound signal representation of the interference source group respectively $\{\mathcal{J}_j, j=1, \ldots, M\}$ are obtained from the auxiliary sound signals of the target source group $\{t_i, i=1, \ldots, N\}$ and the auxiliary sound signals of the interference source group $\{i_j, j=1, \ldots, M\}$ respectively by the corresponding encoder module; and in the embodiment, the above encoding processes are all achieved through the same encoder, so as to ensure that the representations of all the signals are located in the same representation space.

Figure 4:
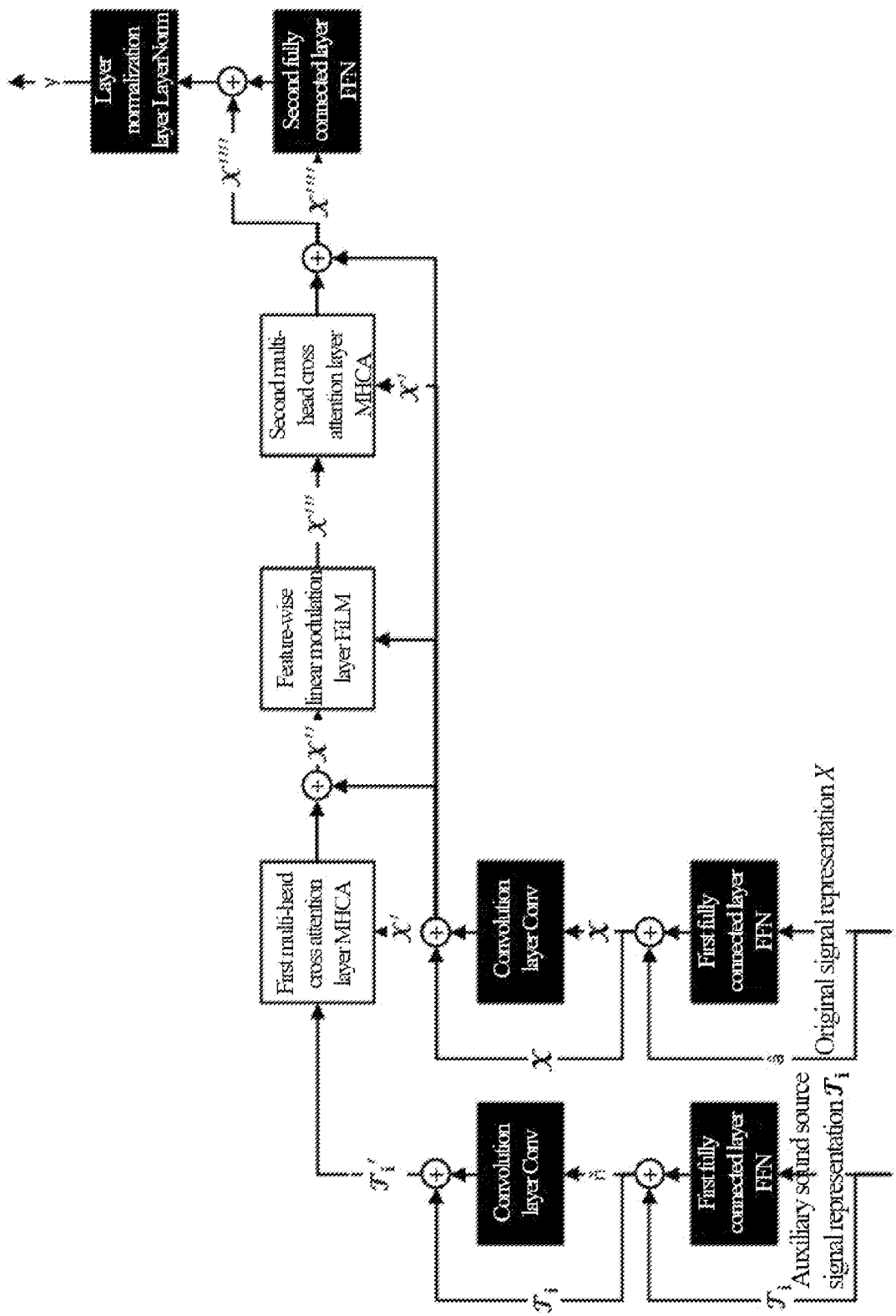
FIG. 4 is a schematic structural diagram of a basic module-cross attention conformer module of an attention model of an embodiment of the present disclosure.

The encoder module and the decoder module in step S55 together form a convolutional network structure of U-net. A convolution layer corresponding to the encoder module and a deconvolution layer corresponding to the decoder module are in skip connection to ensure the lower bound of the quality of the decoded signal. Both the encoder module and the decoder module are each formed by stacking L 1-dimensional convolutional layers or deconvolution layers. In the embodiment, L=5;

S52: a first signal representation $(\chi, \mathcal{T}_i)$ pair and a second signal representation $(\chi, \mathcal{J}_j)$ pair are sequentially selected from the original signal representation $\chi$, the auxiliary sound signal representation $\{\mathcal{T}_i, i=1, \ldots, N\}$ of the target source group and the auxiliary sound signal representation $\{\mathcal{J}_j, j=1, \ldots, M\}$ of the interference source group by the attention model, and an auxiliary sound signals representation mask $\{\mathcal{M}_i^t, i=1, \ldots, N\}$ of the target source group and an auxiliary sound signal representation mask $\{\mathcal{M}_j^i, j=1, \ldots, M\}$ of the interference source group are obtained, the first signal representation $(\chi, \mathcal{T}_i)$ pair includes the original signal representation and the auxiliary sound signal representation of the target source group, and the second signal representation $(\chi, \mathcal{J}_j)$ pair includes the original signal representation and the auxiliary sound signal representation of the interference source group.

referring to FIG. 4, in following steps, taking (the original signal representation and the auxiliary sound signal representation of the target source group) $(\chi, \mathcal{T}_i)$ as an example for illustration, parameter meanings involved in FIG. 4 are specifically described below, and are not repeated in the figure.

Step S521: The attention model is formed by stacking several Conformer modules, and each Conformer module is formed by successively connecting a first fully connected layer FFN, a convolution layer Conv, a first multi-head cross attention layer MHCA, a second multi-head cross attention layer MHCA, a feature-wise linear modulation layer FiLM, a second fully connected layer FFN and a layer normalization layer LayerNorm;

step S522: an advanced representation $\chi'$ of the original signal, an advanced representation $\mathcal{T}_i'$ of the auxiliary sound signals of the target source group and an advanced representation of the auxiliary sound signals of the interference source group are obtained from the original signal representation $\chi$, the auxiliary sound signal representation $\mathcal{T}_i$ of the target source group and the auxiliary sound signal representation $\mathcal{J}_i$ of the interference source group respectively and successively by the first fully connected layer FFN and the convolution layer Conv in the Conformer module;

$\chi_{\_}=\chi+\text{FFN}(\chi), \mathcal{T}_{i\_}=\mathcal{T}_i+\text{FFN}(\mathcal{T}_i)$ $\chi'=\chi_{\_}+\text{Conv}(\chi_{\_}), \mathcal{T}_i'=\mathcal{T}_{i\_}+\text{Conv}(\mathcal{T}_{i\_})$ step S523: the advanced representation $\chi'$ of the original signal is taken as a value (Value, V), and the advanced representation $\mathcal{T}_i'$ auxiliary sound signals of the target source group and the advanced representation of the auxiliary sound signals of the interference source group are taken as a query (Query, Q) and a key (Key, K) respectively to be loaded into the first multi-head cross attention layer MHCA, so as to respectively obtain an original signal modulation vector $\chi''$ corresponding to the auxiliary sound signals of the target source group and an original signal modulation vector corresponding to the auxiliary sound signals of the interference source group;

$\chi''=\chi'+\text{MHCA}(\text{Query}=\mathcal{T}_i',\text{Key}=\mathcal{T}_i',\text{Value}=\chi')$ step S524: the feature-wise linear modulation layer FiLM modulates the original signal advanced representation $\chi'$ on the basis of the original signal modulation vector $\chi''$ corresponding to the auxiliary sound signals of the target source group or the original signal modulation vector corresponding to the auxiliary sound signals of the interference source group, to respectively obtain an more-advanced representation $\chi'''$ of the original signal corresponding to the auxiliary sound signals of the target source group after modulation and an more-advanced representation of the original signal corresponding to the auxiliary sound signals of the interference source group after modulation;

modulation parameters $r(\chi'')$ and $h(\chi'')$ used in a modulation process are respectively affine transformations of the original signal modulation vector $\chi''$;

$\chi'''=\chi'\odot r(\chi'')+h(\chi'')$ $r(\chi'')=W_r\cdot\chi''$ $h(\chi'')=W_h\cdot\chi''$ step S525: the more-advanced representation $\chi'''$ of the original signal corresponding to the auxiliary sound signals of the target source group after modulation and the more-advanced representation of the original signal corresponding to the auxiliary sound signals of the interference source group after modulation are taken as a value (Value, V) and a key (Key, K), and the advanced representation $\chi'$ of the original signal is taken as a query (Query, Q) to be loaded into the second multi-head cross attention layer MHCA to obtain an advanced representation $\chi''''$ after original signal cross conditioning corresponding to the auxiliary sound signals of the target source group and an advanced representation after original signal cross conditioning corresponding to the auxiliary sound signals of the interference source group;

$\chi''''=\chi'+\text{MHCA}(\text{Query}=\chi',\text{Key}=\chi''',\text{Value}=\chi''')$ step S526: an auxiliary sound signal preliminary representation mask $M_i^{t\prime}$ of the target source group and an auxiliary sound signal preliminary representation mask of the interference source group are obtained from the advanced representation $\chi''''$ after original signal cross conditioning corresponding to the auxiliary sound signals of the target source group and the advanced representation after original signal cross conditioning corresponding to the auxiliary sound signals of the interference source group respectively by the second fully connected layer FFN and the layer normalization layer LayerNorm;

that is, preliminary estimation of the auxiliary sound signal preliminary representation mask $M_i^{t\prime}$ of the target source group:

$$M_i^{t\prime}=\text{LayerNorm}(\chi''''+\text{FFN}(\chi''''))$$

step S527: the input of the next Conformer module is the auxiliary sound signal preliminary representation mask $M_i^t$ of the target source group, the auxiliary sound signal representation $\mathcal{T}_i$ of the target source group, the auxiliary sound signal preliminary representation mask of the interference source group, and the auxiliary sound signal representation of the interference source group obtained in S526, and steps S522 to S526 are repeated until all Conformer modules are traversed, to obtain auxiliary sound source signal preliminary representation masks $M_i^t$ of target groups and auxiliary sound signal preliminary representation masks $M_j^i$ of interference groups corresponding to all the Conformer modules.

The speech enhancement model using the multi-source auxiliary sound source information is composed of two groups of multi-branch flows, corresponding to the target auxiliary sound source signal and the interference auxiliary sound source signal respectively; and each group of branches is composed of a plurality of branches, each branch corresponds to one sound source signal, and an output of which is the auxiliary sound signal preliminary representation mask $M_i^t$ of the target source group and the auxiliary sound signal preliminary representation masks $M_j^i$ of the interference group.

Step S53: The auxiliary sound signal representation mask $\{M_i^t, i=1, \ldots, N\}$ of the target source group and the auxiliary sound signal representation mask $\{M_j^i, j=1, \ldots, M\}$ of the interference source group are fused through attention fusion, and a fusion mask $M$ is obtained;

step S531: in-group representation mask fusion is performed on the auxiliary sound signal representation mask $\{M_i^t, i=1, \ldots, N\}$ of the target source group and the auxiliary sound signal representation mask $\{M_j^i, j=1, \ldots, M\}$ of the interference source group in an accumulation mode, to respectively obtain an auxiliary sound signal in-group representation mask $M^t$ of the target source group and an auxiliary sound signal in-group representation mask $M^i$ of the interference source group;

specifically, a fusion method here is accumulation:

$$M^t=\text{Merge}(M_1^t, M_2^t, \ldots, M_N^t)$$

$$M^i=\text{Merge}(M_1^i, M_2^i, \ldots, M_M^i)$$

step S532: intergroup fusion is performed on the auxiliary sound signal in-group representation mask $M^t$ of the target source group and the auxiliary sound signal in-group representation mask $M^i$ of the interference source group in a subtracting mode, to obtain the fusion mask $M$;

$$M=\text{Merge}(M^t, M^i)$$

step S54: the original signal representation $\chi$ uses the fusion mask $M$ to obtain an enhanced representation $\hat{\chi}$;

$$\hat{\chi}=\chi\odot M$$

step S55: the enhanced representation $\hat{\chi}$ is converted into the enhanced speech signal $\hat{x}$ by using the decoder module; and $$\hat{x}=\text{Decoder}(\hat{\chi})$$

the decoder module is composed of a 1-dimensional deconvolution neural network which is formed by stacking L 1-dimensional deconvolution layers. In the present embodiment, L=5; and each deconvolution layer of the decoder module is connected with the corresponding convolution layer of the encoder module in S51 through a skip connection structure.

Taking a perceptual evaluation of speech quality PESQ as an example, on a sample data set of a single target source and a single interference source, the PESQ of the enhanced speech signal of the present disclosure may be relatively improved by about more than 5% relative to a general speech enhancement algorithm.

Corresponding to an embodiment of a collaborative linkage method for Internet of Things devices described above, the present disclosure also provides an embodiment of a collaborative linkage apparatus for Internet of Things devices.

Figure 5:
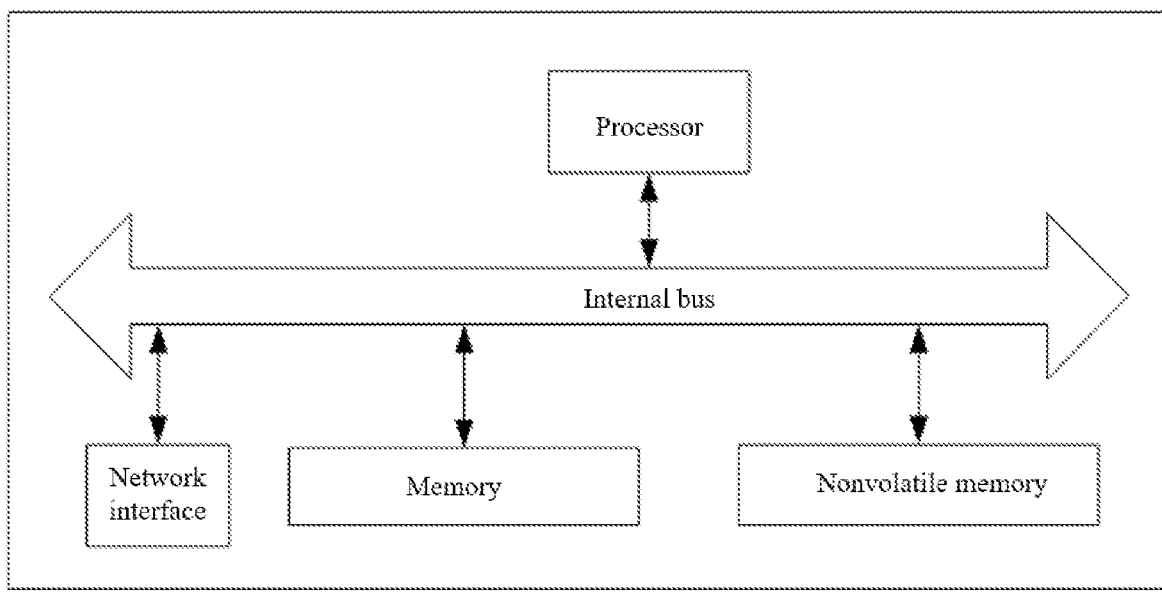
FIG. 5 is a structural diagram of a general speech enhancement apparatus using multi-source auxiliary information of the present disclosure.

Referring to FIG. 5, the embodiment of the present disclosure provides a general speech enhancement apparatus using multi-source auxiliary information, including a memory and one or more processors. An executable code is stored in the memory, and when the executable code is executed by the one or more processors, the apparatus is configured to realize the general speech enhancement method using the multi-source auxiliary information in the above embodiment.

The embodiment of the general speech enhancement apparatus using the multi-source auxiliary information of the present disclosure may be applied to any device with data processing capability, and the any device with the data processing capability may be a device or apparatus such a computer. Apparatus embodiments may be realized by software, or hardware or a combination of hardware and software. Taking software implementations as an example, as a logical apparatus, the apparatus is formed by reading corresponding computer program instructions in a nonvolatile memory into a memory to operate by a processor of any device with the data processing capability. In terms of hardware, any device with the data processing capability where the apparatus in the embodiment is located may also include other hardware generally besides the processor, the memory, a network interface and the nonvolatile memory shown in FIG. 5 according to an actual function of any device with the data processing capability, which will not be repeated here.

The realization process of functions and roles of each unit in the above apparatus is detailed in the realization process of the corresponding steps in the above method, which will not be repeated here.

For the apparatus embodiments, as the apparatus embodiments basically correspond to the method embodiments, relevant points refer to the partial description of the method embodiments. The apparatus embodiments described above are only schematic, the units described as separate parts may or may not be physically separate, and the parts shown as units may or may not be physical units, that is, the parts may be located in one place or distributed to a plurality of network units. Part or all of the modules may be selected according to the actual needs to realize the purpose of the scheme of the present disclosure. Those ordinarily skilled in the art may understood and implement the purpose without creative labor.

An embodiment of the present disclosure further provides a computer readable storage medium, on which a program is stored, and when the program is executed by a processor, the general speech enhancement method using the multi-source auxiliary information in any one of the above embodiments is achieved.

The computer readable storage medium may be an internal storage unit, such as a hard disk or a memory, of any device with data processing capability described in any above embodiment. The computer readable storage medium may also be an external storage device of any device with the data processing capability, such as a plug-in hard disk, a smart media card (SMC), an SD card, a flash card, etc., equipped with the device. Further, the computer readable storage medium may also include both the internal storage unit of any device with data processing capability and the external storage device. The computer readable storage medium is configured to store the computer program and other programs and data required by any device with the data processing capability, and may also be configured to temporarily store data that have been output or are to be output.

The above embodiments are preferred embodiments of the present disclosure only and are not intended to limit the present disclosure, and for those skilled in the art, the present disclosure may have various changes and variations. Any modifications, equivalent substitutions, improvements, etc. made within the spirit and principles of the present disclosure shall be included in the scope of protection of the present disclosure.

What is claimed is:

1. A general speech enhancement method using multi-source auxiliary information, comprising steps of:
    step S1: building a training data set;
    step S2: building a speech enhancement model according to three sub-networks: an encoder module, an attention module and a decoder module, and using the training data set to learn network parameters of the speech enhancement model;
    step S3: building a sound source information database in a pre-collection or on-site collection mode;
    step S4: acquiring an input of the speech enhancement model, wherein the input comprises a noisy original signal to be processed and auxiliary sound signals of a target source group and auxiliary sound signals of an interference source group obtained by using the sound source information database;
    step S5: taking the noisy original signal as a main input of the speech enhancement model, taking the auxiliary sound signals of the target source group and the auxiliary sound signals of the interference source group as side inputs of the speech enhancement model for speech enhancement, and obtaining an enhanced speech signal;
    step S51: obtaining an original signal representation from the noisy original signal by the corresponding encoder module; and obtaining an auxiliary sound signal representation of the target source group and an auxiliary sound signal representation of the interference source group from the auxiliary sound signals of the target source group and the auxiliary sound signals of the interference source group respectively by the corresponding encoder module;
    step S52: sequentially reading a first signal representation pair and a second signal representation pair from the original signal representation, the auxiliary sound signal representation of the target source group and the auxiliary sound signal representation of the interference source group by the attention module, and obtaining an auxiliary sound signal representation mask of the target source group and an auxiliary sound signal representation mask of the interference source group, wherein the first signal representation pair comprises the original signal representation and the auxiliary sound signal representation of the target source group, and the second signal representation pair comprises the original signal representation and the auxiliary sound signal representation of the interference source group;
    step S53: fusing the auxiliary sound signal representation mask of the target source group and the auxiliary sound signal representation mask of the interference source group through attention fusion, and obtaining a fusion mask;
    step S54: obtaining an enhanced representation from the original signal representation using the fusion mask; and
    step S55: converting the enhanced representation into an enhanced speech signal by the decoder module.

2. The general speech enhancement method using the multi-source auxiliary information according to claim 1, wherein step S1 comprises sub-steps of:
    step S11: collecting a fundamental data set, wherein the fundamental data set consists of three parts: a clean human speech data set, a noise data set and a room impulse response data set;
    step S12: randomly selecting a certain speaker from the clean human speech data set as a target speaker, and randomly extracting a target corpus and a target auxiliary information corpus from a corpus set of the target speaker; randomly selecting another different speaker from the clean human speech data set as an interference speaker, and randomly extracting an interference corpus and an interference auxiliary information corpus from a corpus set of the interference speaker;
    step S13: randomly extracting a noise audio from the noise data set;
    step S14: randomly selecting an impulse response from the room impulse response data set;
    step S15: calculating the target corpus, the interference corpus, the noise audio and the impulse response through randomly-set signal-to-noise ratios to obtain a simulated noisy audio; and
    step S16: saving the target corpus, the simulated noisy audio, the target auxiliary information corpus and the interference auxiliary information corpus in the form of a quadruple to obtain the training data set.

3. The general speech enhancement method using the multi-source auxiliary information according to claim 1, wherein step S2 comprises sub-steps of:
    step S21: building the speech enhancement model according to three sub-networks: the encoder module, the attention module and the decoder module, and extracting data in the form of quadruple from the training data set, wherein the data in the form of quadruple comprises a target corpus, a simulated noisy audio, a target auxiliary information corpus and an interference auxiliary information corpus;

step S22: inputting the simulated noisy audio, with the target auxiliary information corpus and the interference auxiliary information corpus, into the speech enhancement model to obtain the enhanced speech signal, and calculating an scale-invariant signal-to-noise ratio (SISNR) loss function, a spectrum loss function and an amplitude loss function by using the target corpus and the enhanced speech signal;

step S23: building a total loss function according to the SISNR loss function, the spectrum loss function and the amplitude loss function;

step S24: updating parameters of the speech enhancement model by using a model updating algorithm of gradient descent deep learning according to the total loss function; and step S25: repeating step S21 to step S24 until the number of iterations for updating reaches a preset number of learning steps, or when 50 rounds of training are completed on all data in the training data set, or when a rate of descent using the total loss function is lower than a preset threshold, or when a relative decline of an in-round average loss function between adjacent training rounds in the training data set is less than 10%, stopping updating and iterating the speech enhancement model, and obtaining the network parameters of the speech enhancement model.

4. The general speech enhancement method using the multi-source auxiliary information according to claim 1, wherein the pre-collection in step S3 is collection of the speaker's registration data in a voiceprint system and/or speech data in historical conversations; and the on-site collection requires a user to produce sounds and speak, and requires the use of a microphone to record a sound production process, thereby obtaining a recording result, wherein the recording result is auxiliary information of the corresponding user.

5. The general speech enhancement method using the multi-source auxiliary information according to claim 1, wherein step S4 comprises sub-steps of:

step S41: acquiring a user's audio signal through collection of a pickup device and network transmission and/or directly using an existing audio file on a memory to obtain the noisy original signal to be processed; and step S42: manually selecting a target group of sound source and an interference group of sound source by a user according to actual demands, and extracting the corresponding auxiliary sound signals of the target source group and auxiliary sound signals of the interference source group from the sound source information database.

6. The general speech enhancement method using the multi-source auxiliary information according to claim 1, wherein step S52 comprises sub-steps of:

step S521: the attention model being formed by stacking several same Conformer modules, and each Conformer module being formed by successively connecting a first fully connected layer FFN, a convolution layer Conv, a first multi-head cross attention layer MHCA, a second multi-head cross attention layer MHCA, a feature-wise linear modulation layer FiLM, a second fully connected layer FFN and a layer normalization layer LayerNorm;

step S522: obtaining an original signal advanced representation, an advanced representation of the auxiliary sound signals of the target source group and an advanced representation of the auxiliary sound signals of the interference source group by sequentially passing the original signal representation, the auxiliary sound signal representation of the target source group and the auxiliary sound signal representation of the interference source group through the first fully connected layer FFN and the convolution layer Conv in the Conformer module;

step S523: loading the advanced representation of the original signal, as a value, the advanced representation of the auxiliary sound signals of the target source group, as a query, and the advanced representation of the auxiliary sound signals of the interference source group, as a key, into the first multi-head cross attention layer MHCA, so as to respectively obtain an original signal modulation vector corresponding to the auxiliary sound signals of the target source group and an original signal modulation vector corresponding to the auxiliary sound signals of the interference source group;

step S524: modulating, by the feature-wise linear modulation layer FiLM, the advanced representation of the original signal on the basis of the original signal modulation vector corresponding to the auxiliary sound signals of the target source group or the original signal modulation vector corresponding to the auxiliary sound signals of the interference source group, so as to respectively obtain a more-advanced representation of the original signal corresponding to the auxiliary sound signals of the target source group after modulation and a more-advanced representation of the original signal corresponding to the auxiliary sound signals of the interference source group after modulation;

step S525: loading the more-advanced representation of the original signal corresponding to the auxiliary sound signals of the target source group after modulation, as a value, the more-advanced representation of the original signal corresponding to the auxiliary sound signals of the interference source group after modulation, as a key, and the advanced representation of the original signal, as a query, into the second multi-head cross attention layer MHCA, so as to obtain an advanced representation of the original signal, corresponding to the auxiliary sound signals of the target source group, after cross conditioning and an advanced representation of the original signal, corresponding to the auxiliary sound signals of the interference source group, after cross conditioning;

step S526: obtaining an auxiliary sound signal preliminary representation mask of the target group and an auxiliary sound signal preliminary representation mask of the interference group by sequentially passing the advanced representation of the original signal, corresponding to the auxiliary sound signals of the target source group, after cross conditioning and the advanced representation of the original signal, corresponding to the auxiliary sound signals of the interference source group, after cross conditioning through the second fully connected layer FFN and the layer normalization layer LayerNorm; and step S527: the input of the next Conformer module being the auxiliary sound signal preliminary representation mask of the target source group, the auxiliary sound signal representation of the target source group, the auxiliary sound signal preliminary representation mask of the interference source group, and the auxiliary sound signal representation of the interference group obtained in S526, repeating step S522 to step S526 until all Conformer modules are traversed, so as to obtain auxiliary sound source signal preliminary representation masks of target groups and auxiliary sound signal preliminary representation masks of interference groups corresponding to all Conformer modules.

7. The general speech enhancement method using the multi-source auxiliary information according to claim 1, wherein step S53 comprises sub-steps of:
   step S531: performing in-group representation mask fusion on the auxiliary sound signal representation mask of the target source group and the auxiliary sound signal representation mask of the interference source group in an accumulation mode, to respectively obtain an auxiliary sound signal in-group representation mask of the target source group and an auxiliary sound signal in-group representation mask of the interference source group; and
   step S532: performing intergroup fusion on the auxiliary sound signal in-group representation mask of the target source group and the auxiliary sound signal in-group representation mask of the interference source group, to obtain the fusion mask.

8. A general speech enhancement apparatus using multi-source auxiliary information, comprising a memory and one or more processors, wherein the memory stores an executable code, and when the one or more processors execute the executable code, the apparatus is configured to achieve the general speech enhancement method using the multi-source auxiliary information according to claim 1.

9. A non-transitory computer-readable storage medium, wherein a program is stored on the non-transitory computer-readable medium, and the program, when executed by a processor, implements the general speech enhancement method using multi-source auxiliary information according to claim 1.

* * * * *